(12) United States Patent
Sheldon et al.

(10) Patent No.: US 12,216,340 B2
(45) Date of Patent: Feb. 4, 2025

(54) EYEWEAR ASSEMBLY HAVING AN ENERGY DISPERSION MECHANISM

(71) Applicant: Brent Sheldon, Miami, FL (US)

(72) Inventors: Brent Sheldon, Miami, FL (US); Guy Brousseau, Jr., Marieville (CA)

(73) Assignee: Brent Sheldon, Miami, FL (US)

( * ) Notice: Subject to any disclaimer, the term of this patent is extended or adjusted under 35 U.S.C. 154(b) by 300 days.

(21) Appl. No.: 17/703,129

(22) Filed: Mar. 24, 2022

(65) Prior Publication Data

US 2022/0269104 A1    Aug. 25, 2022

Related U.S. Application Data

(63) Continuation of application No. PCT/CA2020/051136, filed on Aug. 20, 2020.

(60) Provisional application No. 62/906,408, filed on Sep. 26, 2019.

(51) Int. Cl.
*G02C 5/00* (2006.01)
*G02C 1/06* (2006.01)
*G02C 5/06* (2006.01)

(52) U.S. Cl.
CPC ............... *G02C 5/008* (2013.01); *G02C 1/06* (2013.01); *G02C 5/06* (2013.01); *G02C 2200/16* (2013.01)

(58) Field of Classification Search
CPC .......................... G02C 5/008; G02C 2200/16
See application file for complete search history.

(56) References Cited

U.S. PATENT DOCUMENTS

| | | | | | |
|---|---|---|---|---|---|
| 1,785,929 | A | * | 12/1930 | Bouchard | G02C 1/10 351/83 |
| 3,829,201 | A | * | 8/1974 | Whiting | G02C 1/10 359/819 |
| 4,222,640 | A | * | 9/1980 | Bononi | G02C 3/00 351/122 |
| 4,340,282 | A | * | 7/1982 | Murakami | G02C 1/06 351/86 |

(Continued)

FOREIGN PATENT DOCUMENTS

| | | |
|---|---|---|
| AU | 2009266816 A1 | 1/2010 |
| CN | 102272660 A | 12/2011 |

(Continued)

OTHER PUBLICATIONS

1st Office Action issued in related Chinese Application No. 202080067908.8; dated Mar. 28, 2023.

(Continued)

*Primary Examiner* — Darryl J Collins (57) ABSTRACT

An energy dispersion mechanism can be integrated into the eyewear design to incorporate a more resilient lens holding structure that can disperse the energy received during an impact and retain the lens in place. The energy dispersion mechanism comprises an impact dispersing material seated within a groove of a first frame portion, the impact dispersing material extending beyond the first frame portion to form a nose bridge which joins the first frame portion to a second frame portion; and the impact dispersing material is seated within a groove of a second frame portion. The impact dispersing material may be overmoulded on the eyewear to allow efficient manufacturing.

21 Claims, 10 Drawing Sheets

(56) References Cited

U.S. PATENT DOCUMENTS

| | | | | |
|---|---|---|---|---|
| 4,921,341 | A | * 5/1990 | Ace | G02C 1/10 351/86 |
| 10,254,561 | B1 | * 4/2019 | Santinelli | G02C 1/10 |
| 2005/0275794 | A1 | * 12/2005 | Howard | G02C 11/02 351/41 |
| 2006/0176443 | A1 | 8/2006 | Lin | |
| 2011/0001922 | A1 | 1/2011 | Sheldon | |
| 2016/0016370 | A1 | 1/2016 | Sheldon | |
| 2018/0369021 | A1 | 12/2018 | Sheldon | |
| 2019/0235269 | A1 | * 8/2019 | Wilson | G02C 1/06 |
| 2020/0371379 | A1 | * 11/2020 | Lu | G02C 1/10 |

FOREIGN PATENT DOCUMENTS

| | | |
|---|---|---|
| CN | 102333641 A | 1/2012 |
| CN | 107003539 A | 8/2017 |
| CN | 107924066 A | 4/2018 |
| EP | 0061002 | 9/1982 |
| EP | 0061002 A1 | 9/1982 |
| EP | 1837697 A1 | 9/2007 |
| GB | 2061549 A | 5/1981 |
| JP | S56 126611 U | 9/1981 |
| KR | 20100108692 A | 10/2010 |
| TW | 200628870 A | 8/2006 |

OTHER PUBLICATIONS

Supplemental European Search report issued in related EP Application No. 20867526; Search completed Aug. 28, 2023.

International Search Report issued in corresponding PCT application No. PCT/CA2020/051136; search completed Oct. 26, 2020.

* cited by examiner

EYEWEAR ASSEMBLY HAVING AN ENERGY DISPERSION MECHANISM

CROSS-REFERENCE TO RELATED APPLICATION(S)

This application is a Continuation of PCT Application No. PCT/CA2020/051136 filed on Aug. 20, 2020 and claims priority to U.S. Provisional Patent Application No. 62/906,408 filed on Sep. 26, 2019, the entire contents of which are incorporated herein by reference.

TECHNICAL FIELD

The following relates generally to eyewear and eyewear frames, and more specifically to eyewear frames providing an energy dispersion mechanism.

BACKGROUND

Eyewear such as eyeglasses generally include a frame that supports one or more lenses. The frame typically includes a nose bridge or nose pieces that engage the user's nose to support the eyewear on the user's head. Eyeglasses also typically include a pair of arms attached to (or integral with) the frame, to further support the eyeglasses, e.g. by resting the arms on the user's ears or engaging their head in the temple region. Other eyewear may include other support elements such as straps or bands (e.g., in sports goggles).

Eyeglasses have traditionally utilized frames or frame components made from substantially rigid materials such as plastics, metals, or composite materials. The rigidity of these materials supports the lenses in the frames, and substantially maintains the shape of the eyeglasses such that they consistently fit on a user's head as intended. However, when the eyeglasses are subject to a physical impact, they can break or deform. Additionally, frames made of rigid materials may not be capable of flexing or being flexed.

It is an object of the following to address at least one of the above-noted disadvantages.

SUMMARY

In one aspect, there is provided an energy dispersion mechanism for eyewear comprising, in at least one frame portion for retaining a lens: a groove in the frame portion that surrounds the lens such that part of the frame portion is interposed between the lens and the groove; and an impact dispersing material positioned in at least a portion of the groove.

In another aspect, there is provided eyewear having an energy dispersion mechanism, comprising: a first frame portion surrounding and retaining a first lens; a second frame portion surrounding and retaining a second lens; first and second arms extending from the first and second frame portions respectively; and a bridge portion connecting the first frame portion to the second frame portion; wherein the energy dispersion mechanism comprises, in at least one of the frame portions: a groove in that frame portion that surrounds the respective lens such that part of that frame portion is interposed between the respective lens and the groove; and an impact dispersing material positioned in at least a portion of the groove.

In yet another aspect, there is provided a method of providing an energy dispersion mechanism to eyewear, comprising: forming a groove in at least one frame portion of the eyewear, the frame portion surrounding a lens such that part of the frame portion is interposed between the lens and the groove; and applying an impact dispersing material to at least a portion of the groove.

BRIEF DESCRIPTION OF THE DRAWINGS

Embodiments will now be described with reference to the appended drawings wherein:

FIG. 5c is enlarged partial view of a frame having a track incorporated into the groove shown in FIG. 5a;

DETAILED DESCRIPTION

Eyewear frames or frame components generally made from rigid materials such as plastics, metals, or composite materials can crack, break or deform when the eyewear is subject to a physical impact. An energy dispersion mechanism can be integrated into the frame of eyewear to incorporate a more resilient lens holding structure that can disperse the energy received during an impact through the frame while retaining the lens in place.

The energy dispersion mechanism can be provided by incorporating a groove in an eyewear frame surrounding the lens of the eyewear. The frame having the groove can accommodate an impact dispersing material that can also absorb some of the impact's energy. For example, the groove can provide some resilience or "give" in the frame structure such that the lens contained by the frame on one side of the groove can flex and deform upon impact and transfer at least some of the energy from the impact to the frame. The groove thus permits some flexure of the frame itself. The groove can also be adapted to include a track or other additional profile to promote adhesion of impact dispersing material and to further absorb the energy from an impact.

Figure 1:
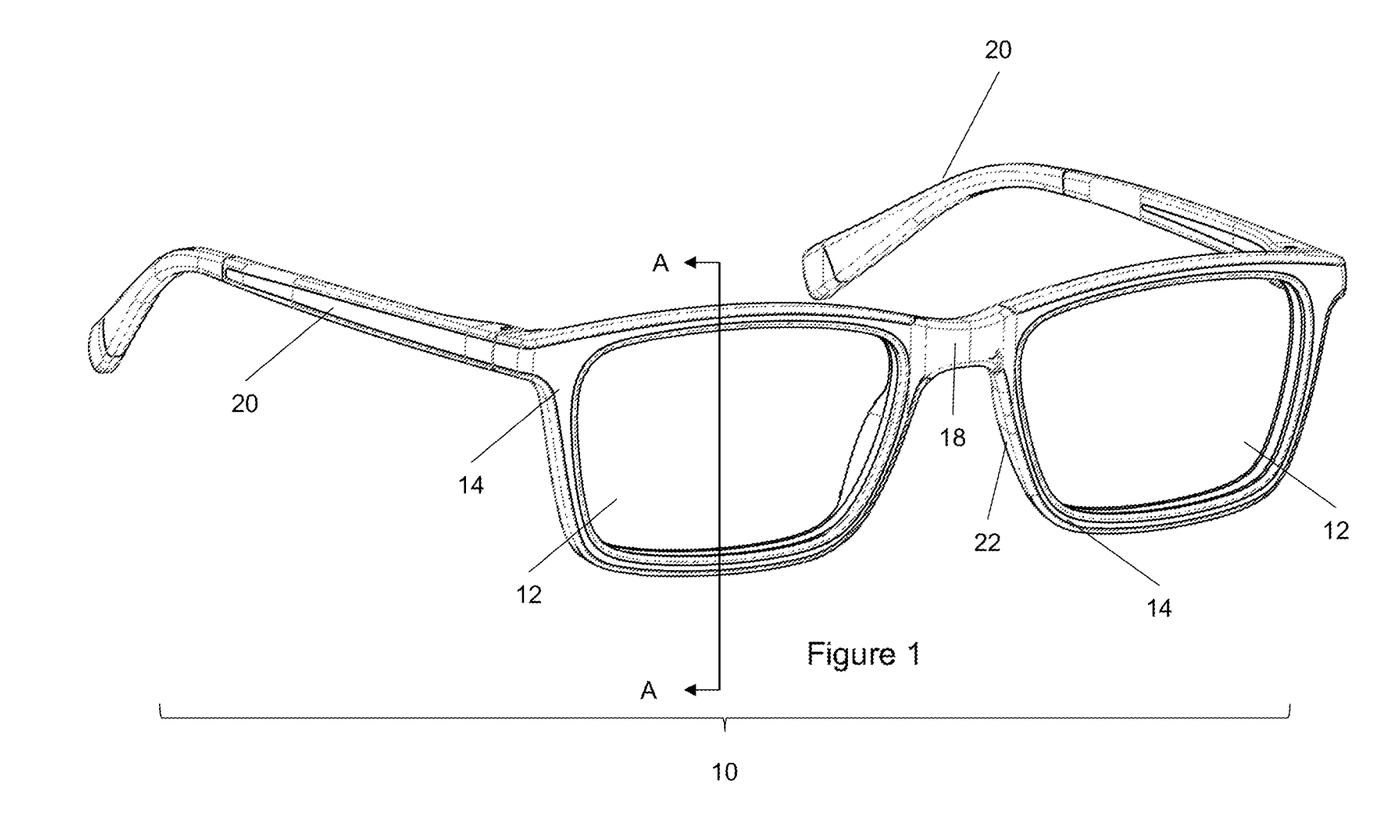
FIG. 1 is a perspective view of eyewear assembly having an energy dispersion mechanism incorporated into the frame.

Turning now to the figures, FIG. 1 provides a perspective view of an eyewear assembly 10. The eyewear assembly 10 includes a frame 22 that holds a pair of lenses 12. The frame 22 includes a nose bridge portion 18, a pair of arms 20, and an impact dispersing material 14. The impact dispersing material 14 is substantially flexible and can be constructed from an elastomer such as thermoplastic polyurethane (TPU), rubber or thermoplastic rubber (TRP), soft plastic, or any other suitable material. This allows the energy dispersion mechanism to be readily integrated into the eyewear design and incorporates a more resilient frame 22 which is adapted to disperse energy received during an impact. Furthermore, the lens 12 can be retained in place during and after experiencing an impact. The additional "give" in the frame 22 can also facilitate the insertion of the lenses 12 into the frame 22.

Figure 2:
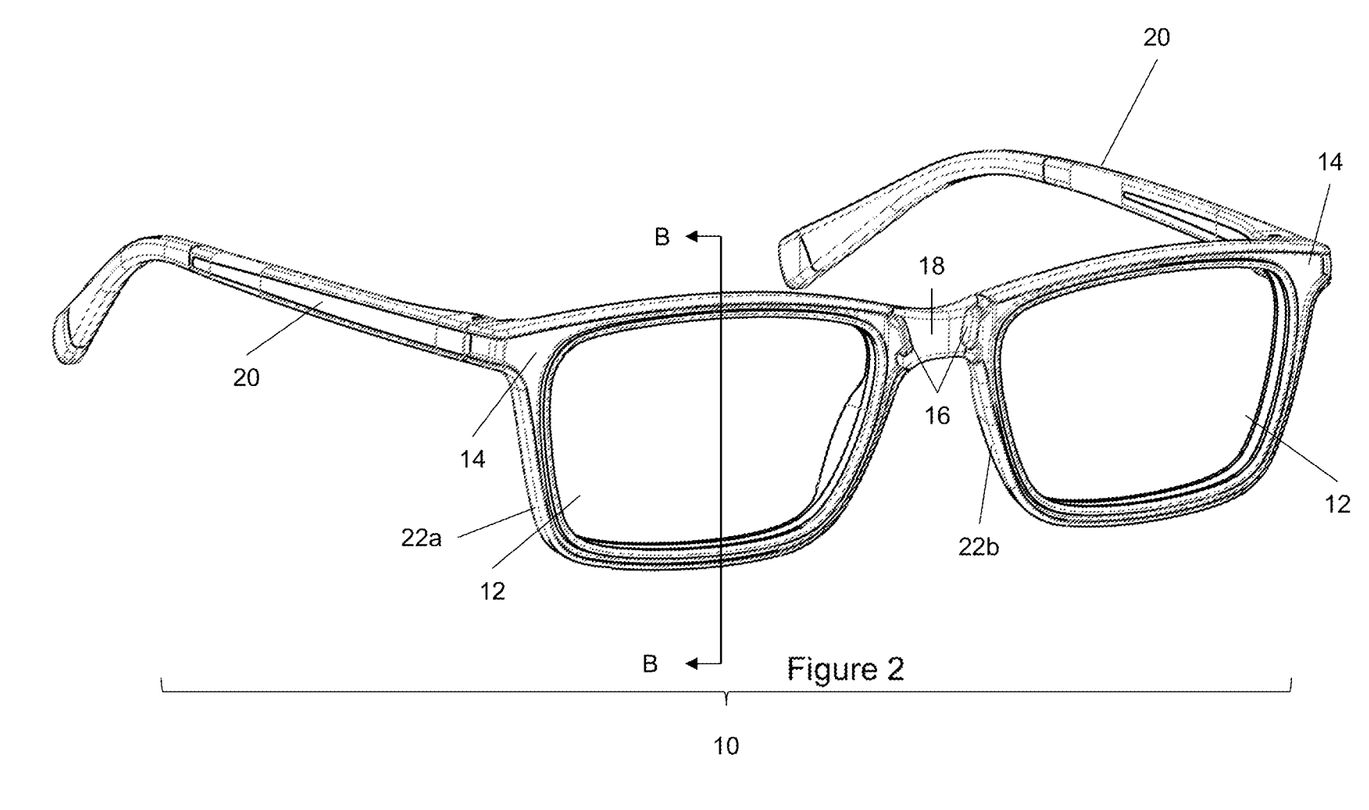
FIG. 2 is a perspective view of the eyewear assembly shown in FIG. 1, with transparency used to illustrate interior components.

FIG. 2 provides a perspective view of the eyewear assembly 10 shown with transparency to illustrate interior components. The eyewear assembly 10 includes a pair of frame portions 22a and 22b connected together via a nose bridge portion 18. The material from which the frame portions are held together, can extend into the grooves of the frame portions 22a, 22b, to further couple or connect the frame portions together. The frame portions 22a, 22b further comprise rigid attachment members 16 which also connect the frame portions 22a, 22b to the nose bridge portion 18. The nose bridge portion 18 can be constructed from the same material as the impact dispersing material 14. That is to say that the impact dispersing material 14 found around the lens 12 and the flexible material constructing the nose bridge portion 18 may be a singular component. However, the nose bridge portion 18 may be constructed from a different material than the impact dispersing material 14 and be coupled thereto. The nose bridge portion 18 may be constructed from any suitable material having some ability to deform or flex. Moreover, it can be appreciated that while preferable, the nose bridge portion 18 may also be rigid or substantially rigid and covered or coated with the flexible material used to fill the grooves of the frame portions 22a, 22b.

Figure 3:
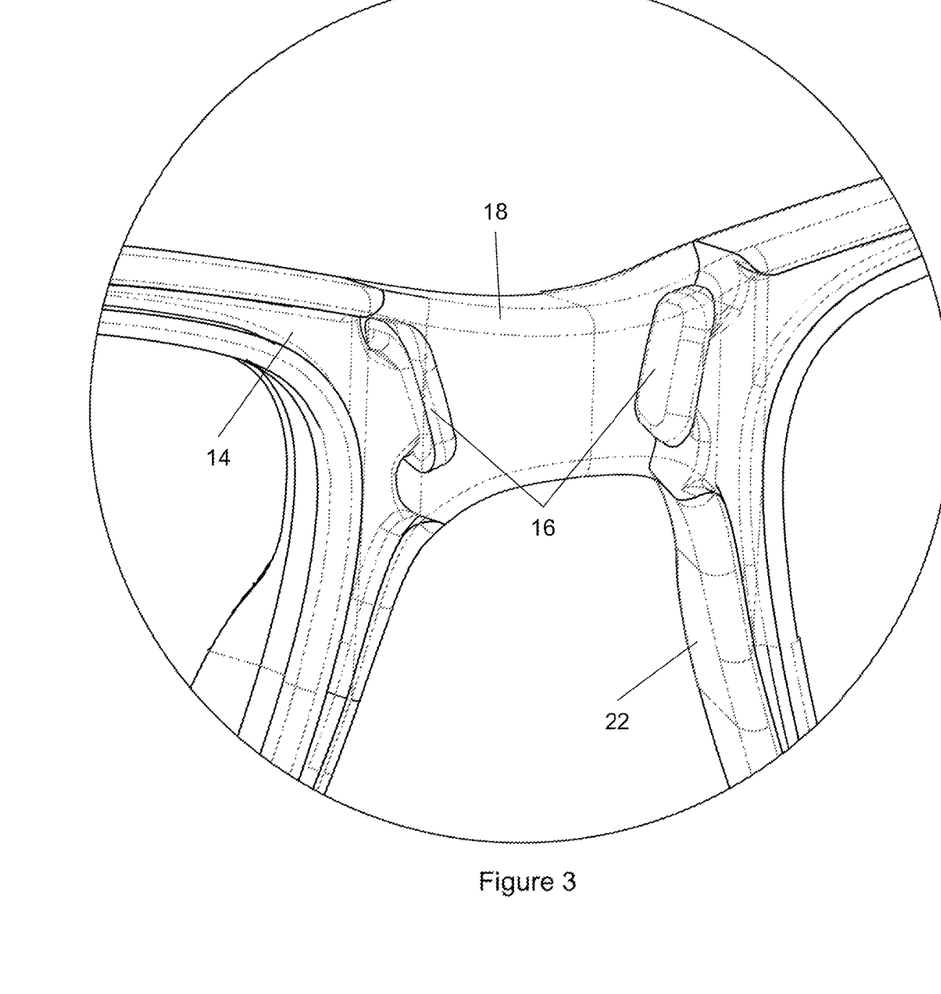
FIG. 3 is an enlarged partial view of the eyewear assembly shown in FIG. 2.

FIG. 3 is an enlarged partial view of the eyewear shown in FIG. 2. In this example, the rigid attachment members 16 protrude from each of the frame portions 22a, 22b and toward each other. The frame 22 in this example is formed of separate pieces, one on either side of the nose bridge portion 18, thus providing the pair of frame portions 22a and 22b coupled to each other via the bridge portion 18. The rigid attachment members 16 protrude from the frame portions 22a, 22b at the nose bridge portion 18 such that the nose bridge portion 18 can be attached or formed therebetween, in this example by embedding the attachment members 16. To that end, the nose bridge portion 18 and impact dispersing material 14 can be overmoulded on and/or around the rigid attachment members 16. The shape of the rigid attachment members can vary insofar as the rigid attachment members 16 can act as substrates for the overmoulding process.

The nose bridge portion 18 connects one frame portion 22a to the other frame portion 22b. The nose bridge portion 18 can be constructed from a soft plastic, or any other suitable material which allows the nose bridge portion 18 to be deformable or expandable. The soft plastic allows the nose bridge portion 18 to feel soft against a wearer's nose and to provide more comfort in the eyewear assembly 10. The softer materials, such as rubber, also provide sufficient gripping capabilities, so the eyewear 10 does not slide off the wearer's nose.

Figure 4:
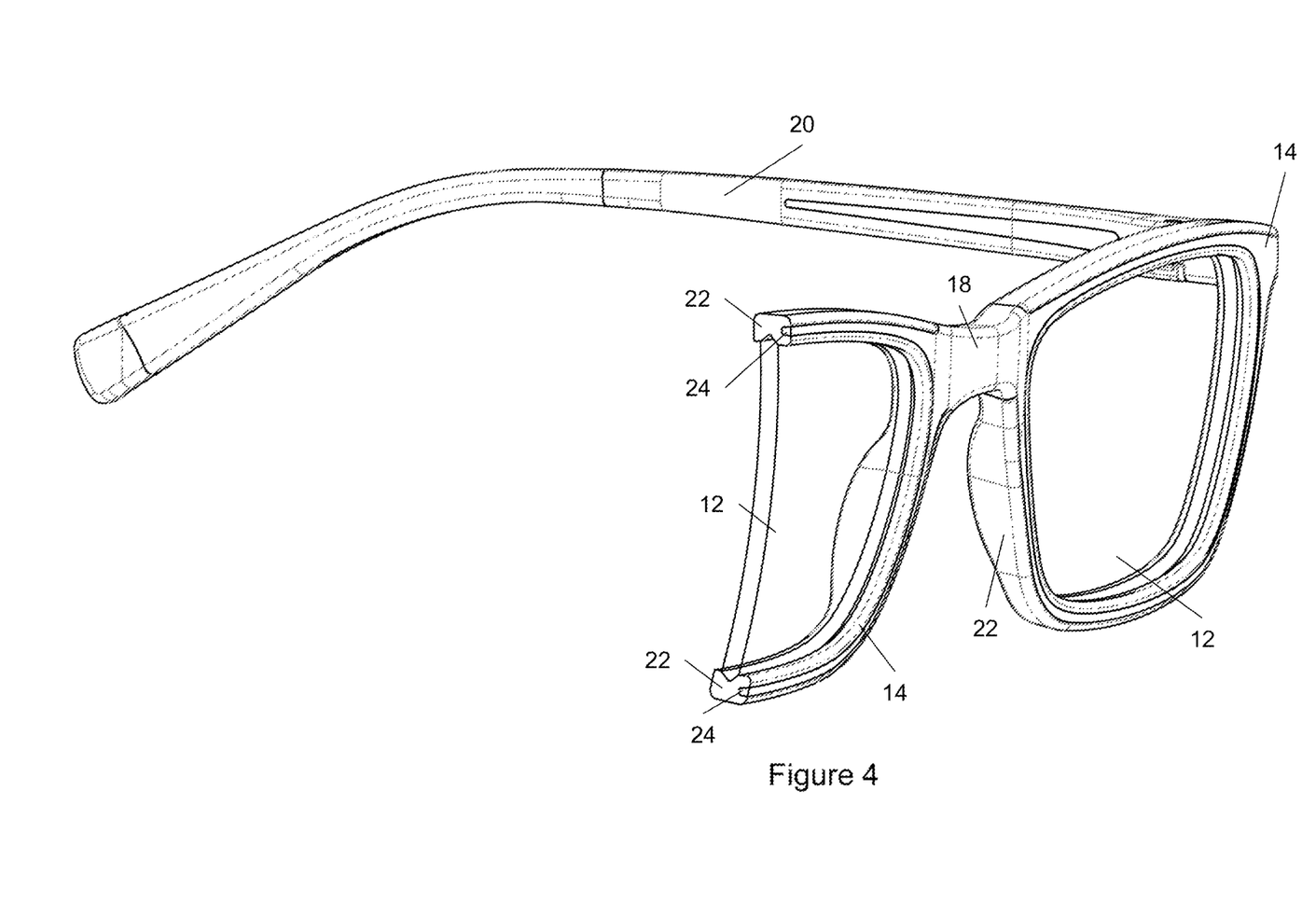
FIG. 4 is a cross-sectional perspective view of the eyewear assembly shown in FIG. 1, taken along line A-A.

FIG. 4 shows a cross-sectional perspective view of the eyewear assembly shown in FIG. 1, taken along line A-A. From the cross-section of the frame, it can be appreciated that the impact dispersing material 14 is fitted into the frame 22 around the lens 12 using a groove 24 in the frame portions 22a, 22b. A structural flexibility is created along the frame 22, in the form of this groove 24. By integrating the impact dispersing material 14 into the frame 22, the strength of the frame 22 may be increased and/or the portions of the frame 22 having the groove may partially flex, expand or contract to absorb energy from an impact or other force. Thus, the eyewear 10 is protected against deformations due to impact all while retaining the shape of the eyewear 10 and the lens 12. The integrated system also allows the thickness of the eyewear rim to be smaller while still passing impact tests.

Figure 5A:
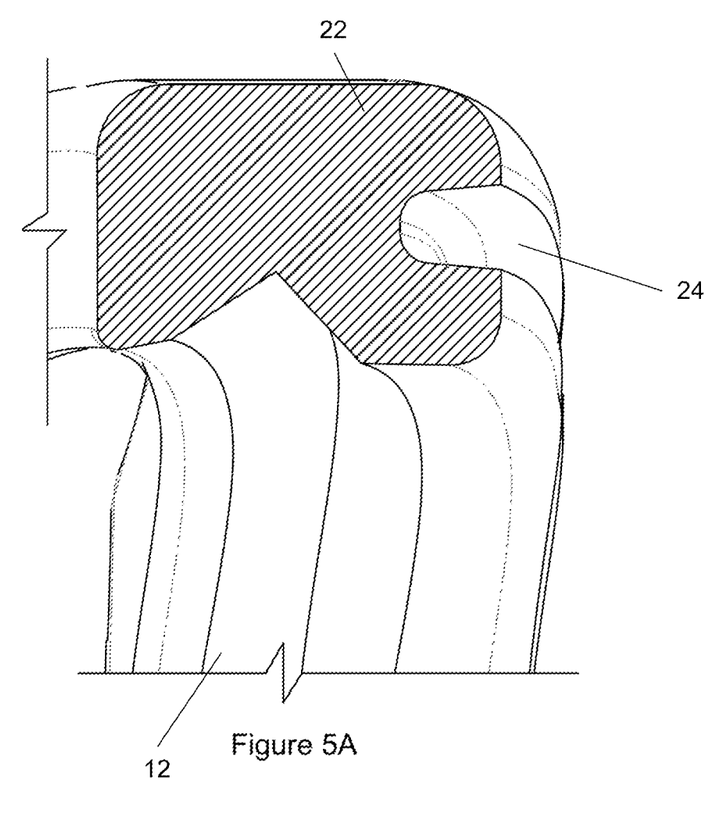
FIG. 5a is enlarged partial view of the frame shown and encircled in FIG. 4 illustrating a groove in the frame.

FIG. 5a is enlarged partial view of the energy dispersion mechanism shown in the encircled portion of FIG. 4. The groove 24 can be created along the frame portions 22 to seat an impact dispersing material 14, in this example along the forward facing side of the frame 22 from where an impact is more likely to occur. The groove 24 alters the structure of the eyewear to permit the above-noted flexure. The groove 24 can be created on the surface of the frame 22 and can entirely or partially surround the lens 12. Furthermore, the groove 24 can also be located on the front and/or back surface of the eyewear and can entirely or partially cover the surface of the frame 22.

Figure 5B:
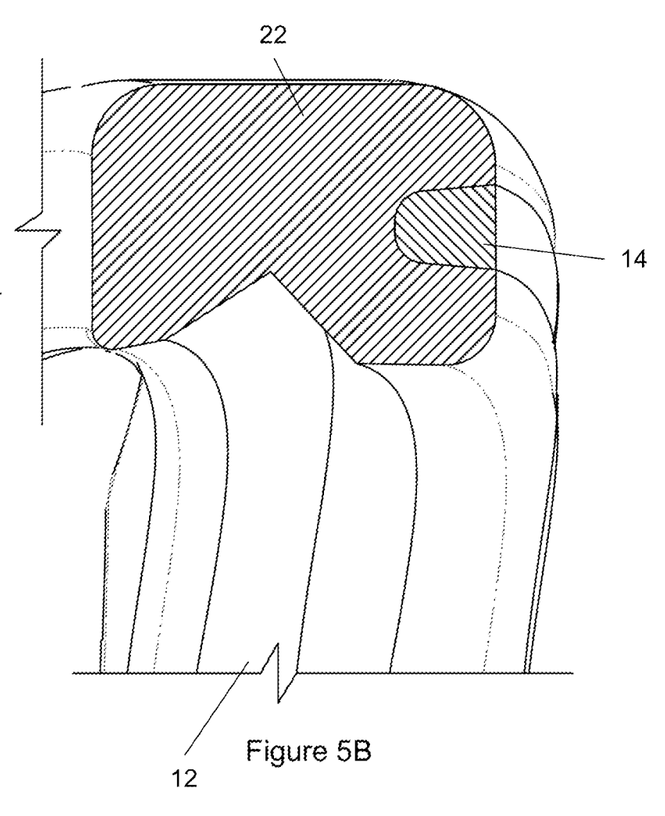
FIG. 5b is an enlarged partial view of the frame shown and encircled in FIG. 4 illustrating a material embedded in the groove of the frame.

FIG. 5b is an enlarged partial view of the energy dispersion mechanism shown in the encircled portion of FIG. 4. As mentioned above, the groove 24 can be created along the frame portions 22a, 22b to alter the structure and flexibility of the frame portions 22a, 22b when experiencing an impact or other force. The groove 24 can be overmolded with an impact dispersing material 14, such that the flexure or movement of the frame portions 22 in the vicinity of the grooves 24 is absorbed by the impact dispersing material 14 to disperse the energy. It can be appreciated that the impact dispersing material 14 can also provide some additional strength to the frame portions 22a, 22b caused by the removal of material to provide the grooves 24. The impact dispersing material 14 can be seated in the groove 24 on the surface of the frame 22 and can also be located on either the front and/or back surface of the frame 22, entirely or partially covering the surface of the frame 22.

Figure 5C:
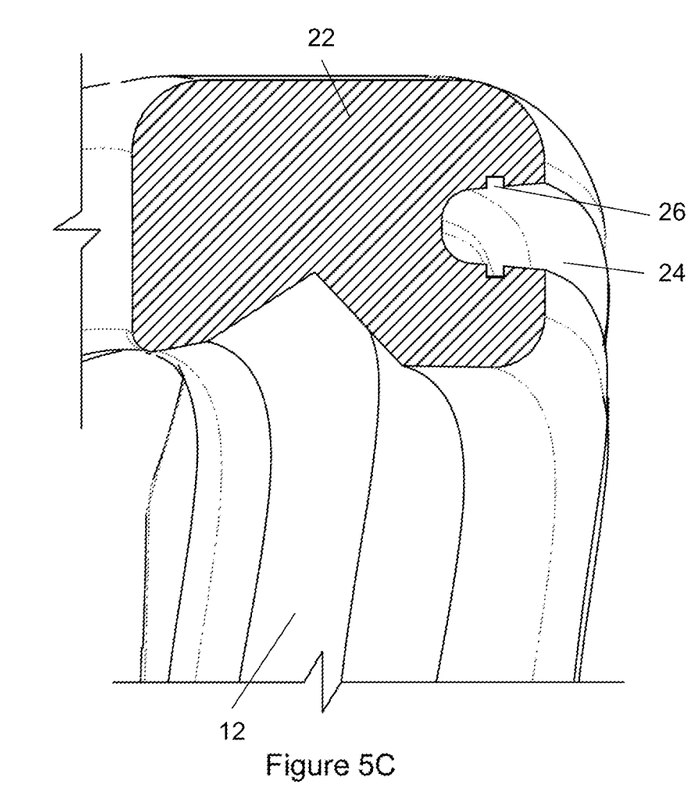
Figure 5D:
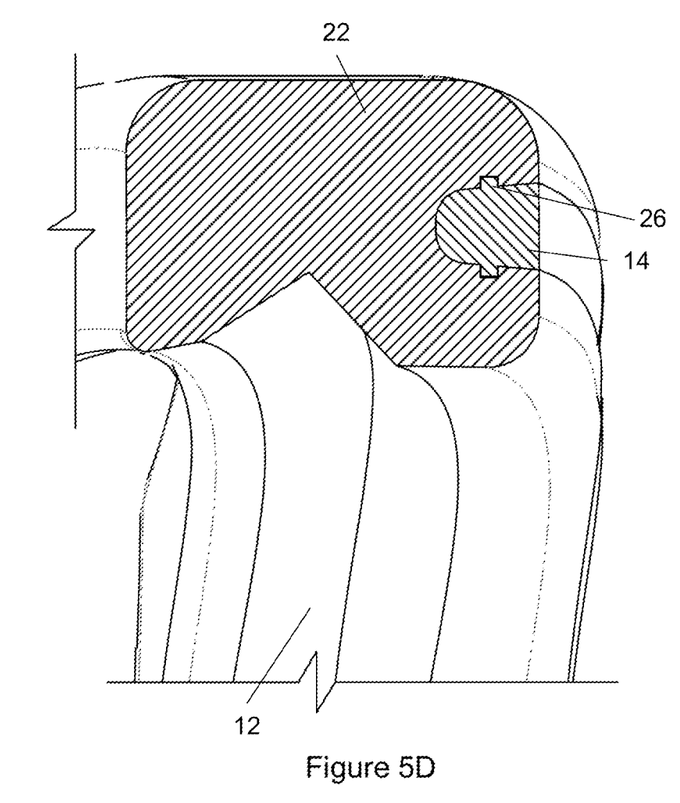
FIG. 5d is an enlarged partial view of the frame having a track illustrating a material embedded in the track and groove of the frame.

In another embodiment, the groove 24 may have one or more notches or ridges forming a track 26. The track 26 may provide added surface area for receiving and bonding the impact dispersing material 14 to the frame 22. FIG. 5c provides an enlarged partial view of a frame having a track 26 along and within the grooves 24. It can be appreciated that the notches or ridges forming the track 26 may be of any suitable shape (e.g., circular, rectangular, etc.) and/or the groove 24 may include any suitable number of tracks 26 (e.g., an opposing pair, three or more, etc.). FIG. 5d is an enlarged partial view of the frame 22 having a pair of tracks 26 across from each other on the groove 24 illustrating the impact dispersing material 14 being embedded in the tracks 26 of the frame 22. It can be appreciated that the inclusion of the tracks 26 can increase the adhesion between the frame 22 and the impact dispersing material 14 and can provide additional energy dispersion and absorption properties to the eyewear assembly 10.

Figure 6:
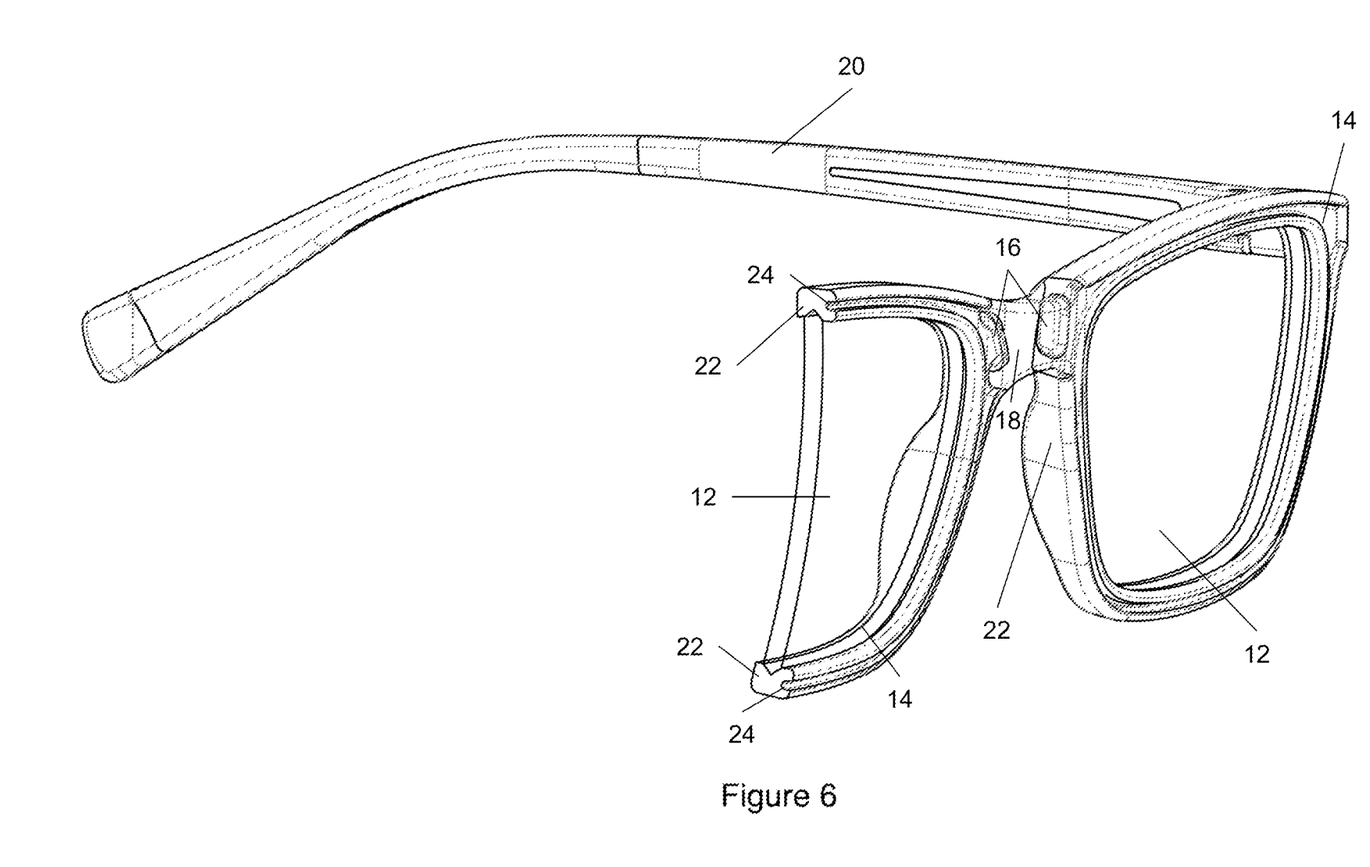
FIG. 6 is a cross-sectional perspective view of the eyewear assembly shown in FIG. 2, taken along line B-B.

FIG. 6 is a cross-sectional perspective view of the eyewear assembly shown in FIG. 2, taken along line B-B. In this example, further detail can be seen showing that the frame 22 can be assembled by overmoulding the attachment members 16, which protrude from the frame portions 22, within the material that forms the nose bride portion 18. This effectively couples one frame portion 22a to the other frame portion 22b via the nose bridge portion 18 to provide flexibility and resiliency to the overall eyewear. The impact dispersing material 14 can be deposited or overmoulded on/to the rigid attachment members 16 to form the nose bridge portion 18. The impact dispersing material 14 can extend beyond the nose bridge portion and be deposited into the groove 24 and/or track 26 to cover the surface of the frame portions 22a, 22b. Therefore, the energy dispersion mechanism comprises an impact dispersing material 14 seated within a groove 24 and/or track 26 of a first frame portion 22a, the impact dispersing material 14 extending beyond the first frame portion 22a, to form a nose bridge 18 which joins the first frame portion 22a to a second frame portion 22b. The impact dispersing material 14 is seated within a groove 24 and/or track 26 of a second frame portion 22b.

Figure 7:
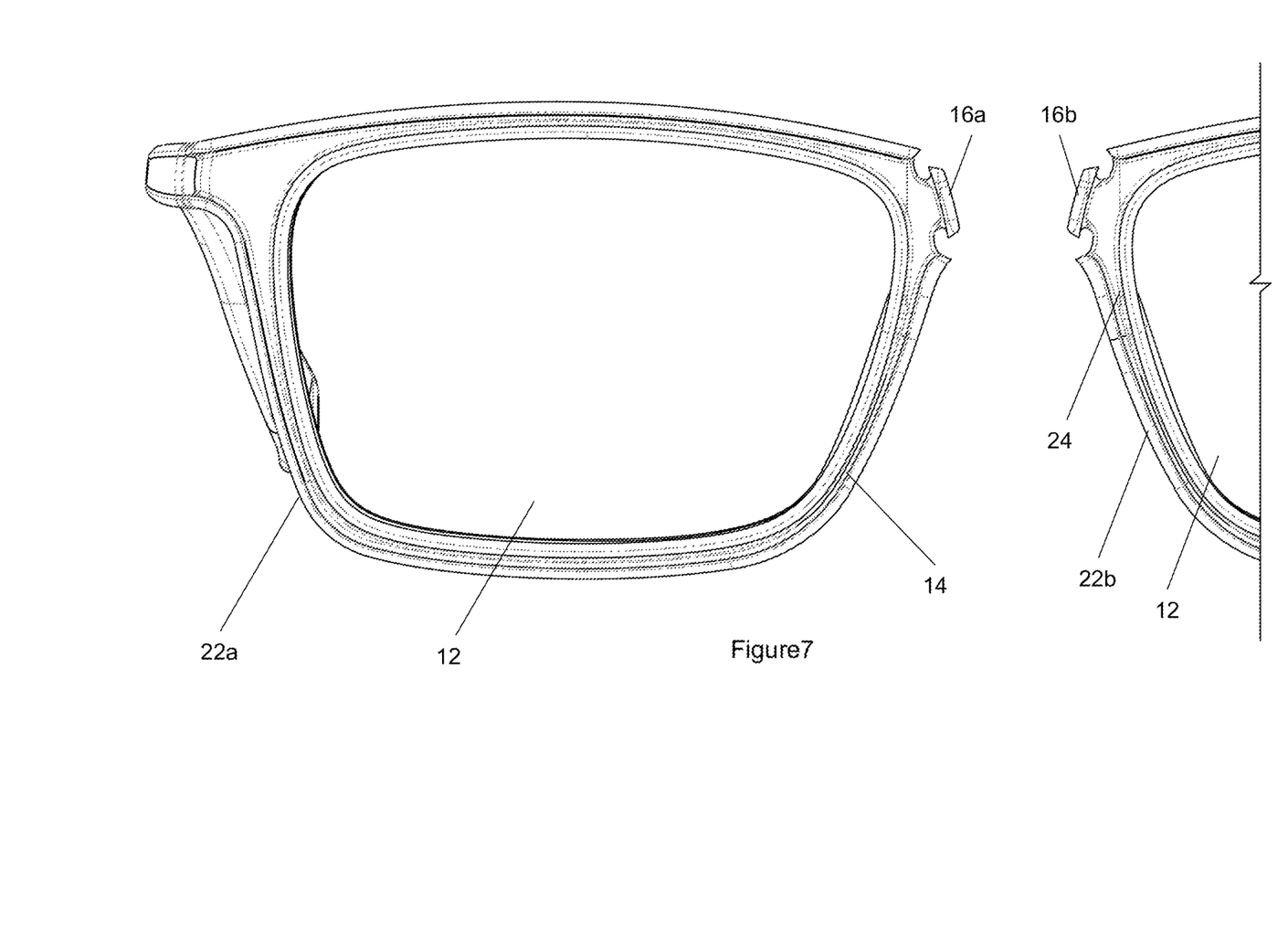
FIG. 7 is a front partial view of eyewear frame portions having an energy dispersion mechanism.

FIG. 7 is a front partial view of eyewear frame portions 22a, 22b having an energy dispersion mechanism. A first rigid attachment member 16a protrudes from the first frame portion 22a and a second rigid attachment member 16b protrudes from the second frame portion 22b. The first frame portion 22a can be joined to the second frame portion 22b using a nose bridge portion 18. The rigid attachment members 16a, 16b can be joined to the nose bridge portion 18 using a variety of methods including an overmoulding, a snap-fit assembly, fasteners or any other suitable attachment method. For the overmoulding process, a portion of the rigid attachment members 16a, 16b may act as the substrate that is overmolded with a suitable impact dispersing material 14. Additionally, the groove 24 and/or track 26 may act as the substrate that is overmolded with a suitable flexible material to create the impact dispersion mechanism. The attachment members 16 may be made metal, carbon fiber, plastic, or any other suitable rigid material.

It can be appreciated that the first frame portion 22a is a mirror image of the second frame portion 22b. Therefore, the rigid attachment members 16a, 16b protrude from a respective first side of the frame portions 22a, 22b, however, the first side is mirrored on each of the frame portions 22a, 22b.

The groove 24 and/or track 26 can be created by milling, drilling, CNC machining, or using any other technique. Alternatively, the frame 22 can be designed having a groove 24 and/or track 26 such that it is manufactured already having a groove 24 and/or track 26. Eyewear frames can be manufactured using injection molding, 3D printing, extrusion, compression moulding or any other technique used to manufacture a frame 22. The surface of the frame 22 may entirely or partially be covered by the groove 24 and/or track 26.

Figure 8:
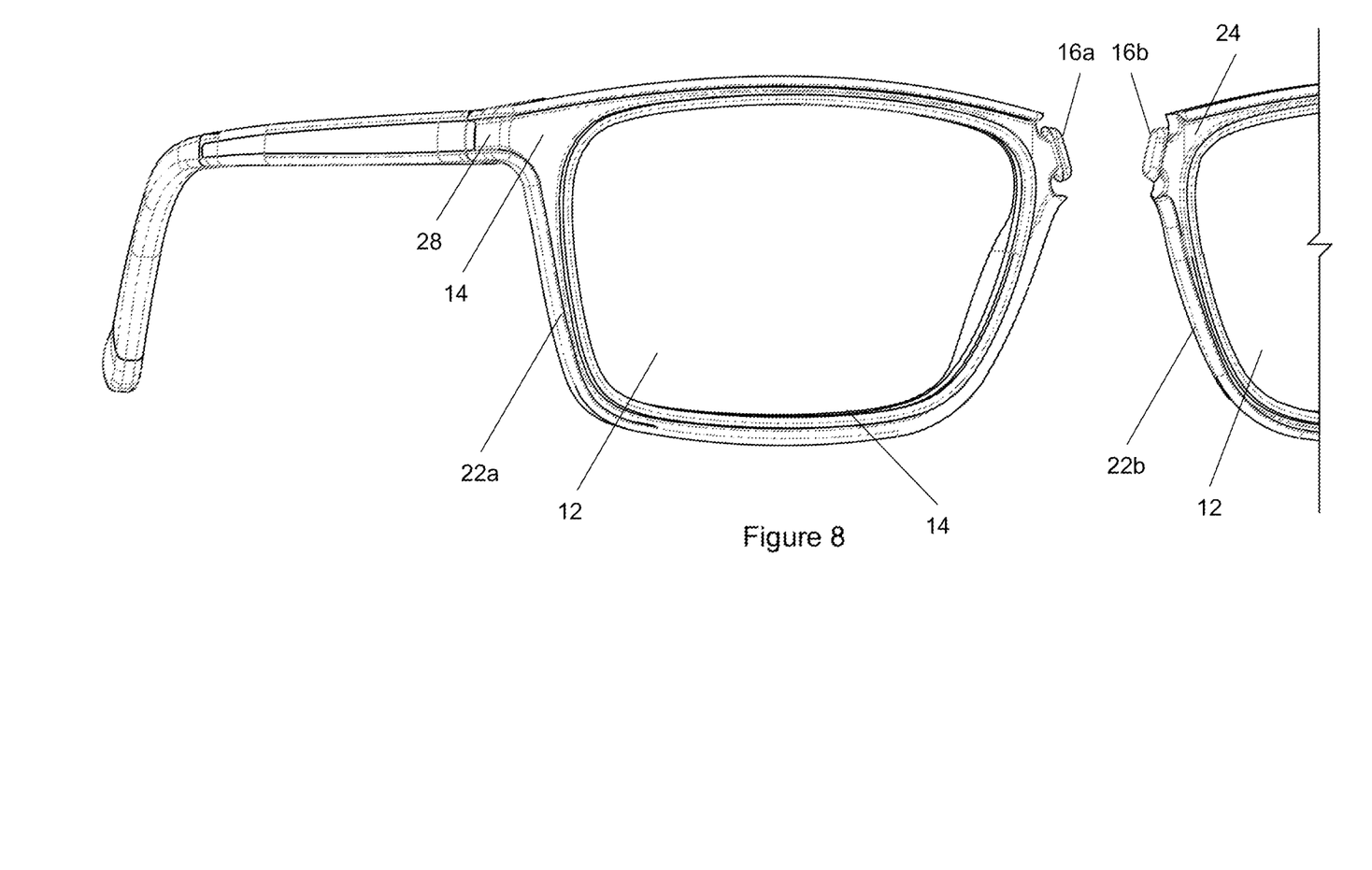
FIG. 8 is perspective partial view of the eyewear frame portions shown in FIG. 7.

FIG. 8 is perspective partial view of the eyewear frame portions 22a, 22b shown in FIG. 7. A nose bridge portion 18 can be created by overmolding an impact dispersing material 14 onto the rigid attachment members 16a and 16b. This forms a bridge which attaches the first frame portion 22a to the second frame portion 22b at a wearer's nose. In this example, a groove 24 is created on the front surface of each of the frame portions 22, completely surrounding the lens 12. The impact dispersing material 14 can be added to the groove 24 by overmoulding an impact dispersing material into the groove 24 to create the energy dispersion mechanism.

One side of the rigid attachment members 16a, 16b may be provided with one or more slots (or other passages) for receiving material during the overmolding process, as described in detail below. The impact dispersing material 14 can be overmolded on the attachment members 16 and/or to the groove to create the eyewear dispersion mechanism. The construction of the eyewear dispersion mechanism can be done using any suitable overmolding process. Overmolding, sometimes referred to as two times injection molding, is a process where a single part is created using two or more different materials in combination. Typically, the first material (or substrate) is partially or fully covered by overmolded material during the manufacturing process. In this case, a portion of the rigid attachment members 16 or the groove 24 and/or the track 26 may act as the substrate that is overmolded with the material used to create the eyewear dispersion mechanism.

The overmolded material is generally an elastomer such as thermoplastic TPU, rubber or TRP, soft plastic, or any other suitable material. The impact dispersing material 14 can be overmolded to the rigid attachment members 16 prior to attaching the impact dispersing material 14 to the frame 22. That is, the nose bridge portion 18 can be constructed as a separate component that is incorporated into the assembly process. However, the nose bridge portion 18 can also be constructed along with the lens component such that the entire impact dispersive component is incorporated into the assembly process.

The rigid attachment members 16 can be used to join the nose bridge portion 18 to the frame 22. In this example, at least one prong 16a protrudes from the first frame portion 22a and joins the first frame portion 22a to a first side of the nose bridge portion 18, and at least one prong 16b protrudes from the second frame portion 22b and joins the second frame portion 22b to a second side of the overmolded bridge portion 18, opposite the first. The attachment members 16 can be made from a rigid material to provide stability and support for the eyewear 10 when the overmolded bridge 18 is attached to the frame. The rigid attachment members 16 may be made from metal by machining or stamping, or from polymers such as polycarbonate. It should be apparent that any other rigid material may also be used to form the rigid attachment members 16 using methods commonly used in the art.

The rigid attachment members 16 can be provided with the one or more passages for the overmolding process (not shown). For instance, the material of the overmolded bridge 18 may flow through the passages during the overmolding process and fill those passages to provide additional gripping and encapsulation of the rigid attachment members, forming a stronger hold between the overmolded bridge portion 18 and the frame 22. It can be appreciated that any number of elongated passages, slots or holes of any geometry can be used.

Furthermore, the groove 24 and/or track 26 of the frame portions 22 can also be provided with the one or more passages for the overmolding process. For instance, the overmolded impact dispersing material 14 of may flow through the passages during the overmolding process and fill those passages to provide additional gripping and encapsulation of the frame, forming a stronger hold between the overmolded impact dispersing material 14 and the frame 22. It can be appreciated that any number of elongated passages, slots or holes of any geometry can be used. Similarly, the tracks 26, which are formed to extend outwardly from the groove 24 may themselves have recesses extending further into the frame 22 to provide even further energy dispersion and gripping hold for the material 14.

The nose bridge portion 18 may include notches sized to receive the rigid attachment members 16a and 16b. The frame portions 22 can also be provided with slots for receiving the prongs of the rigid attachment members. Fasteners such as screws may also be used to join the nose bridge portion 18 to the frame 22. This can add additional support to the frame structure, and can hold the eyewear assembly in place prior to overmoulding.

The impact dispersing material 14 can alternatively be injection molded as a separate component and then snapfitted into the groove 24 or track 26 to form the energy dispersion mechanism. The impact dispersing material 14 can be formed as a single component spanning from one temple 28 of the eyewear to the other temple of the eyewear, including the portion surrounding the lens 12 as well as the nose bridge portion 18. Alternatively, the impact dispersing material 14 can be formed as a plurality of components separated and subsequently joined together. For example, the temple 28 of the eyewear and the first frame portion 22*a* can form a first flexible component, the nose bridge portion 18 can form a second flexible component, and the temple of the eyewear and the second frame portion 22*b* can form a third flexible component. These flexible components can be joined together first, or directly attached to the frame 22 using any suitable means including adhesives, fasteners, etc.

In an alternative embodiment, the eyewear 10 may be assembled by inserting or snapping the prongs 16*a*, 16*b* of the frame in into a nose bridge portion having recesses for receiving the prongs. Snapping the prongs 16*a*, 16*b* into the recesses can cause the prongs to deform slightly to be inserted within the recesses.

Figure 9:
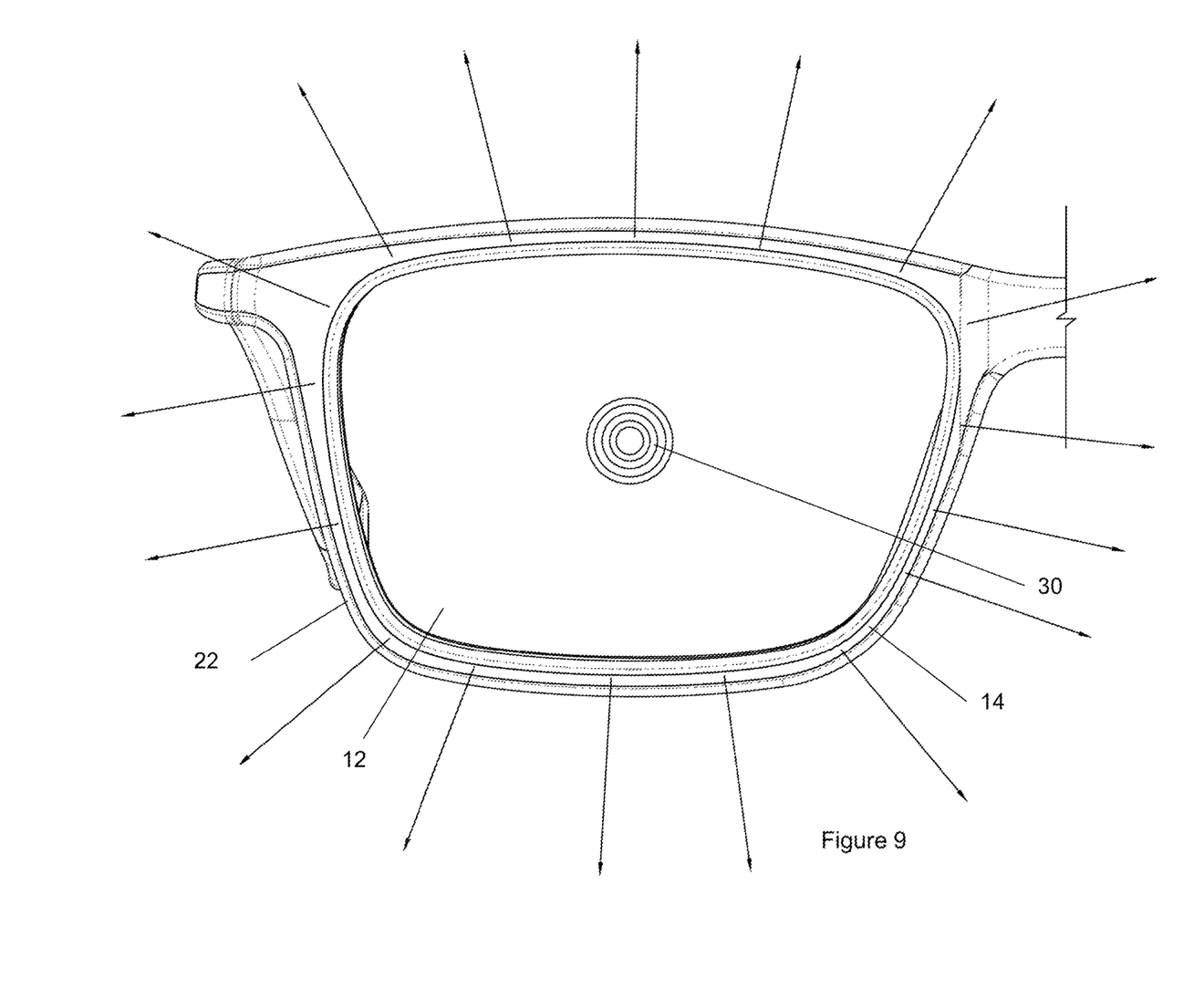
FIG. 9 is a front partial view of an eyewear frame portion having an energy dispersion mechanism, during an impact.

FIG. 9 is a front partial view of an eyewear frame portion having an energy dispersion mechanism, during an impact. In this embodiment, the convex lens 12 of the eyewear is receiving an impact 30. Upon impact, the convex lens 12 flexes as it absorbs some of the energy. The frame 22, having an energy dispersion mechanism, absorbs more of the impact 30 and disperses it, causing less deformation to the lens. The impact dispersing material 14 disperses the impact away from the lens 12 and frame 22. Furthermore, the grooves 24 and/or tracks 26 created in the frame 22 provide flexibility in the frame 22. However, due to the resiliency of the impact dispersing material 14, the grooves 24 and/or tracks 26 can maintain a hold of the lenses 12 while absorbing some of the energy from the impact 30. Thus, the impact dispersing material 14 absorbs the energy received during impact and disperses it to the frame 22 and surrounding areas while retaining the lens 12 in place.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures, and components have not been described in detail so as not to obscure the examples described herein. Also, the description is not considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

Although the above principles have been described with reference to certain specific examples, various modifications thereof will be apparent to those skilled in the art as outlined in the appended claims.

The invention claimed is:

1. An energy dispersion mechanism for eyewear comprising, in at least one frame portion for retaining a lens within a lens retaining groove:
    a groove formed in and extending at least partially along the frame portion that surrounds the lens such that part of the frame portion is interposed between the lens retaining groove and the groove; and
    an impact dispersing material positioned and extending within the groove such that the impact dispersing material does not contact with and is spaced apart from the lens and has the frame portion interposed therebetween.

2. The energy dispersion mechanism of claim 1, wherein a first groove is formed in a first frame portion and a second groove is formed in a second frame portion.

3. The energy dispersion mechanism of claim 2, wherein the impact dispersing material extends between the first and second grooves via a bridge portion.

4. The energy dispersion mechanism of claim 3, wherein the impact dispersing material embeds a rigid attachment member extending from each frame portion towards the bridge portion to provide flexibility in the bridge portion.

5. The energy dispersion mechanism of claim 1, wherein the impact dispersing material is overmoulded in the groove.

6. The energy dispersion mechanism of claim 1, wherein the groove comprises at least one notch or ridge extending into the frame portion to form a track.

7. The energy dispersion mechanism of claim 6, wherein the impact dispersing material is overmoulded into the groove and the track.

8. Eyewear having an energy dispersion mechanism, comprising:
    a first frame portion surrounding and retaining a first lens within a first lens retaining groove;
    a second frame portion surrounding and retaining a second lens within a second lens retaining groove;
    first and second arms extending from the first and second frame portions respectively; and
    a bridge portion connecting the first frame portion to the second frame portion;
    wherein the energy dispersion mechanism comprises, in at least one of the frame portions:
    a groove formed in and extending at least partially along that frame portion that surrounds the respective lens such that part of that frame portion is interposed between the respective lens retaining groove and the groove; and
    an impact dispersing material positioned and extending within the groove such that the impact dispersing material does not contact with and is spaced apart from the respective lens and has the respective frame portion interposed therebetween.

9. The eyewear of claim 8, wherein a first groove is formed in the first frame portion and a second groove is formed in the second frame portion.

10. The eyewear of claim 9, wherein the impact dispersing material extends between the first and second grooves via the bridge portion.

11. The eyewear of claim 10, wherein the impact dispersing material embeds a rigid attachment member extending from each frame portion towards the bridge portion to provide flexibility in the bridge portion.

12. The eyewear of claim 8, wherein the impact dispersing material is overmoulded in the groove.

13. The eyewear of claim 8, wherein the groove comprises at least one notch or ridge extending into the frame portion to form a track.

14. The eyewear of claim 13, wherein the impact dispersing material is overmoulded into the groove and the track.

15. A method of providing an energy dispersion mechanism to eyewear, comprising:

forming a groove in and extending at least partially along at least one frame portion of the eyewear, the frame portion retaining a lens within a lens retainer and surrounding the lens such that part of the frame portion is interposed between the lens retaining groove and the groove; and applying an impact dispersing material to extend within the groove such that the impact dispersing material does not contact with and is spaced apart from the lens and has the frame portion interposed therebetween.

16. The method of claim 15, wherein the impact dispersing material is applied to grooves formed in first and second frame portions.

17. The method of claim 16, wherein the impact dispersing material extends between the first and second grooves via a bridge portion between the frame portions.

18. The method of claim 17, wherein the impact dispersing material embeds a rigid attachment member extending from each frame portion towards the bridge portion to provide flexibility in the bridge portion.

19. The method of claim 15, further comprising assembling at least one additional component of the eyewear.

20. The method of claim 15, further comprising forming at least one notch or ridge extending into the frame portion from the groove, to form a track.

21. The method of claim 15, wherein the impact dispersion material is applied using an overmolding technique.

* * * * *